United States Patent [19]

Wong

[11] Patent Number: 4,920,556
[45] Date of Patent: Apr. 24, 1990

[54] TELEPHONE WITH BUILT-IN EMERGENCY PANIC SWITCH, LONG DISTANCE TOLL TIMER AND MUSIC ON HOLD CARDS

[76] Inventor: Keith K. Wong, 15 Wilderness Trail, Warren, N.J. 07060

[21] Appl. No.: 309,497

[22] Filed: Feb. 13, 1989

[51] Int. Cl.⁵ .................... H04M 1/21; H04M 1/27; H04M 11/04; H04M 15/00
[52] U.S. Cl. ..................... 379/51; 379/131; 379/101; 379/374
[58] Field of Search .................. 379/131, 37, 51, 101, 379/393, 166, 163, 374

[56] References Cited

U.S. PATENT DOCUMENTS 4,260,855 4/1981 Rubinstein ......................... 379/131
4,415,776 11/1983 Tang et al. ........................ 379/101
4,417,100 11/1983 Carlson et al. ...................... 379/51

Primary Examiner—Stafford D. Schreyer

[57] ABSTRACT

An improved telephone with three built in features that provide added conveniences and additional benefits for the user. These features are: Money Saver Timer, which tells the caller the amount of time is left of the current message or toll unit on a long distance call; Telephone Panic Switch, when pressed, will activate a circuit to automatically call and broadcast an emergency message to a group of pre-stored numbers; Music On Hold cards, which allow the user to play different music programs for the HOLD feature. These cards can be changed frequently to provide different music programs to the frequent caller.

10 Claims, 5 Drawing Sheets

TELEPHONE WITH BUILT-IN EMERGENCY PANIC SWITCH, LONG DISTANCE TOLL TIMER AND MUSIC ON HOLD CARDS

BACKGROUND OF THE INVENTION

This invention relates to the useful features that are added to an ordinary telephone transceiver, hereafter called telephone or phone. There are four main basic functions required of an ordinary telephone: the first is to convert audio signal from the mouth piece to electrical signal for the central switching system; the second is to convert electrical signal from the central switching system to the ear piece; the third is to provide a means for the caller to specify the destination telephone number desired; the last one is a means to signal that a call is waiting.

In the early days, the telephone was rather primitive. The technology was limited. Many things were done manually. The caller had to tell an operator what the destination number he wanted. With the advents of relays, vacuum tubes, transistors and integrated circuits, we saw the telephone change from rotary dials to touch tone to memory speed dialing and to cordless phone.

This invention further improves the usefulness of the telephone. This invention consists of the following items that may be incorporated in a common telephone.

MST-Money Saver Timer, it is a built in timer on the telephone that tells the caller how much time he has left of the current message unit for long distance calls. For residential and most commercial lines, each message unit is one minute in duration. The usage charge is based on the number of units taken. Frequently, however, most of the last message unit is wasted if the caller terminates the call before the whole unit is consumed. Since, there is not any timer on the telephone to tell him where he is timewise, he cannot easily decide when he should terminate the conversation. The result is that he wastes all the unused seconds in the last message unit. To him as a consumer, it is an economic loss. For transcontinental and international calls, it is considerably expensive to waste one message unit. Of course, he can use his watch or the clock on the wall to keep time. But it will certainly distract his attention from the conversation. This newly invented MST will solve this problem. It is a simple digital display timer that is conveniently positioned on the telephone that shows the total number of message units elapsed and the status of the current message unit or toll unit. It shows how many more seconds remaining of the current message unit. This way, the caller can easily determine when to terminate the call. To use the Money Saver Timer, the caller will dial a toll call as usual and wait until the call is answered. As soon as the call is picked up on the other side, the MST will be activated by its own sensing electronics or by a switch pushed by the caller manually. He can then look at the MST display every now and then to see how many message units he has used and where he is in the current message unit. Also, an indicator light will flash to warn him when the current toll unit is about to end. When the call is finished, the MST can be reset electronically by monitoring the line condition when the call is finished, or it can be reset manually by the caller. After reset, the MST switch can become a digital clock.

TPS, Telephone Panic Switch—Nowadays, Crime and personal security are becoming a serious concern for many people in any big city. Even in the comfort of their own home, people are worried about intruders. Any product that can discourage the intruder or seek help from the outside world when an intrusion is occurring will be very beneficial to these people.

This TPS invention can specifically provide a solution to this problem. Once activated, it can automatically call a list of prestored telephone numbers and send a pre-stored emergency message to each number called. Since all the telephone numbers and the emergency message are stored in semiconductor memory, the whole calling operation is carried out in absolute silence. Not even the mechanical noice of a tape player. Only the person that activated the panic switch knows the events occurring. The TPS will automatically call each number on the list and send out the message when the call is picked up. The list may contain phone numbers for the police, the neighbors and friends. The TPS consists of an electronic circuit and a physical switch connected to it. The electronic circuit can be an integral part of a telephone or housed in a separate box, which is then connected to the telephone line. The physical switch can be concealed in any convenient place.

MOHC, Music On Hold Card—many modern electronic telephones have the HOLD capability. It allows the user to temporary disable the telephone without actually disconnecting it. This way, the other party will not be able to hear anything from the phone. However, the major drawback of this kind of HOLD is that the party on HOLD might become so bored that he hangs up prematurely. We have recently seen an improvement of the HOLD: instead of complete silence, the party that is put on HOLD will hear a pre-recorded song or music. Unfortunately, the underlying problem is still not completely eliminated: the party on HOLD will still feel bored if the music is always the same. This is especially annoying for those frequent callers.

For those big central telephone systems, it is not too difficult to change or cycle the music for HOLD. One simple way is to connect a radio or tape player to the central HOLD circuit. This is actually working quite well for commercial installations. But what about the average person? What about those millions of inexpensive desk top, counter top, phones? Up to this moment, the most common method is using a built in solid stae music generator inside the telephone. The music generator will repetatively play the song(s) recorded in it when the HOLD is activated. This is preferred over a radio or tape player because of size and cost considerations. But the solution is still not complete: no matter how interesting the recorded songs are, they are bound to cause boredom if they are always the same!

This MOHC invention improves on the current technology and provides a better solution to the problem. Each MOHC is a small printed circuit board the size of a postal stamp with all the integrated electronics on it to generate music or song(s). It can be plugged into the telephone with ease: as simple as changing the battery in a toy. This way, the telephone owner can change the card frequently to suit the occasion, much like changing a tape or compact disc. He can, for example, put in a MOHC card that plays Christmas songs in December. In fact, he can keep a library of these MOHC cards for different occasions.

SUMMARY OF THE PRESENT INVENTION

It is therefore an object of this invention to provide an improved telephone: a telephone that does more than just calling numbers. Another object of the invention is to provide a telephone that has a built in timer to help the user save on long distance calls. With this timer, the MST, the Money Saver Timer, the phone user can avoid wasting the unused seconds in the last message unit or he can avoid taking the last message unit by ending the conversation a few seconds sooner. The savings thus realized can be very substantial for those really long long-distance calls.

Another object of the invention is to provide a telephone that has a built in capability to summon outside help in time of emergency with this TPS, the Telephone Panic Switch capability, the phone user can secretly push a concealed switch when he feels the need for outside emergency help. Once activated this way, the TPS electronics will immediately call a list of pre-stored numbers. For each number called, the TPS electronics will automatically broadcast a pre-recorded message to the receiving party.

Another object of the invention is to provide a telephone that can accept small plug in type music cards for the HOLD button. For an inexpensive consumer type telephone, this new capability, MOHC, Music On Hold Card, should add a great flexibility to the Hold feature. It eliminates the drawback of forcing the caller to listen to the same pre-recorded music over and over again. With these plug in MOHC cards, the phone user can pick a special MOHC card from his library and plug it into the telephone. A selection can be made to cater to the occasion or to his mood.

DESCRIPTION OF THE PREFERRED EMBODIMENT

Figure 1:
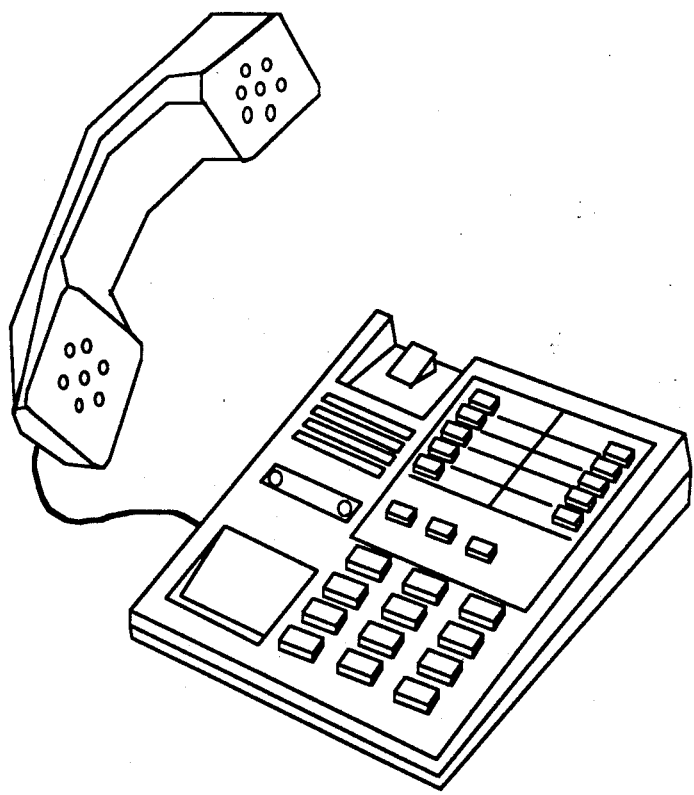
FIG. 1 shows a typical electronic telephone.
Figure 2:
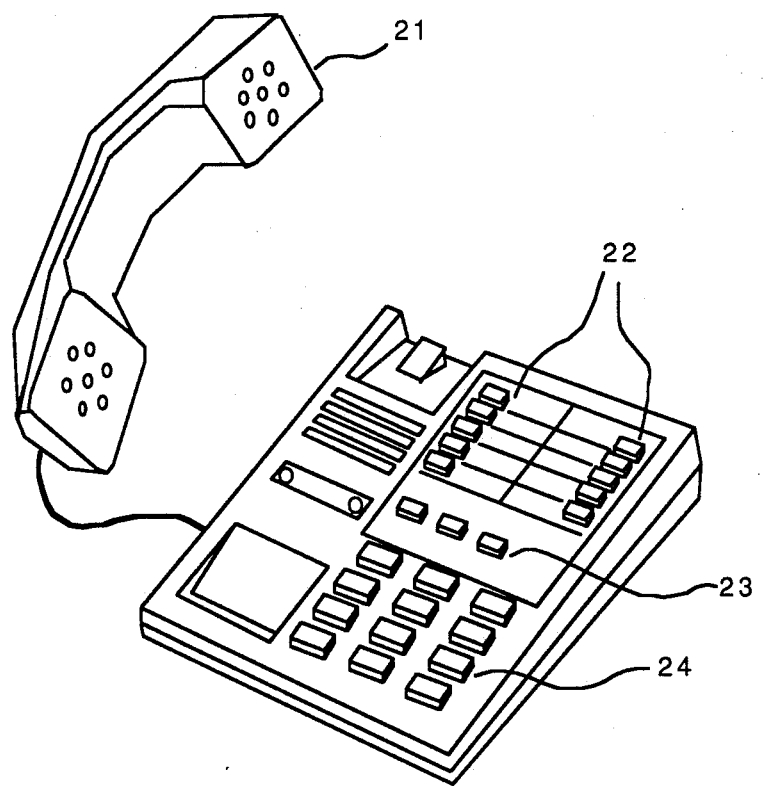
FIG. 2 shows most the common features that are available in a modern electronic telephone.

FIG. 2 shows most of the common features found on a modern electronic telephone: a handset 21; memory auto dialer buttons 22; miscellaneous buttons 23 for things like Hold, Flash and Redial etc; and regular touch tone buttons 24.

Figure 3:
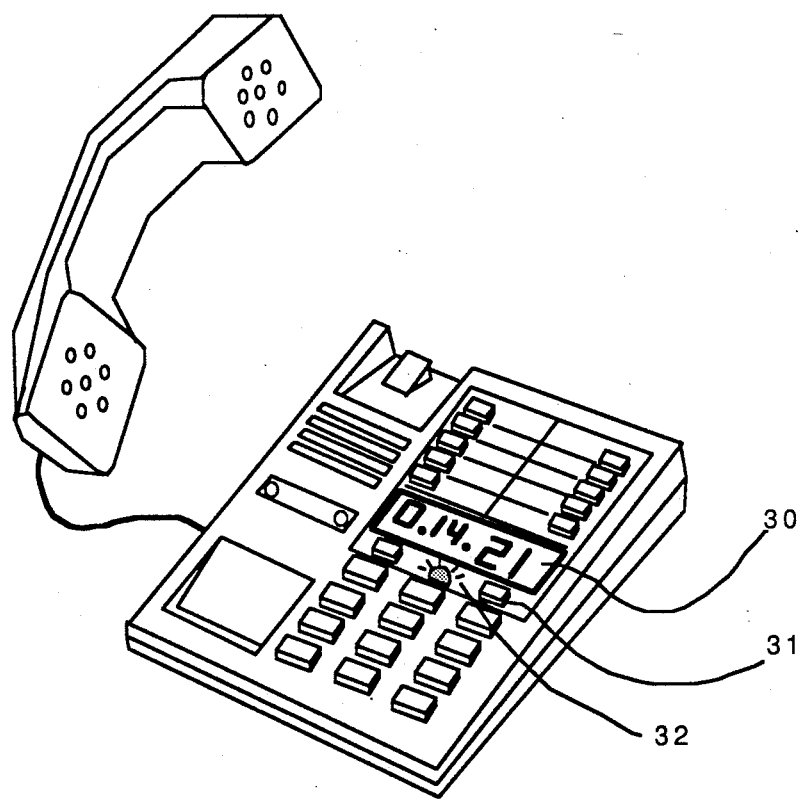
FIG. 3 shows the new Money Saver Timer feature added to the telephone in FIG. 1

FIG. 3 shows the Money Saver Timer 30, MST, installed on the telephone's front panel. From the example displayed: (0.14.21), it means that there have been fourteen complete message or toll units used and that there have been twenty one seconds used in the current unit. Note that if the message unit is equal to sixty seconds in duration, then the display will be like a regular clock timer. But one message unit can equal to any temporal unit, not necessarily sixty seconds. One of the miscellaneous switches 31 is used to set or reset the MST. Indicator light 32 will flash to warn the user that there are only a few seconds left of the current toll unit; that a new unit will soon start if the conversation is not ended quickly.

Figure 4:
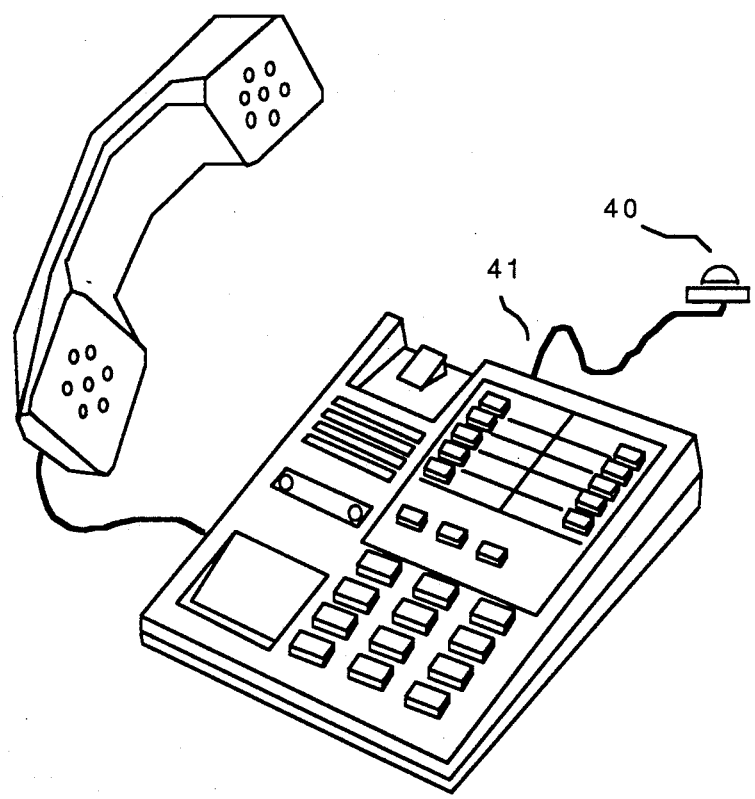
FIG. 4 shows the new Telephone Panic Switch feature added to the telephone in FIG. 1.

FIG. 4 shows the Telephone Panic Switch 40 connected to the telephone through a cable 41. The switch 40 can be concealed in any secure place for emergency use.

Figure 5:
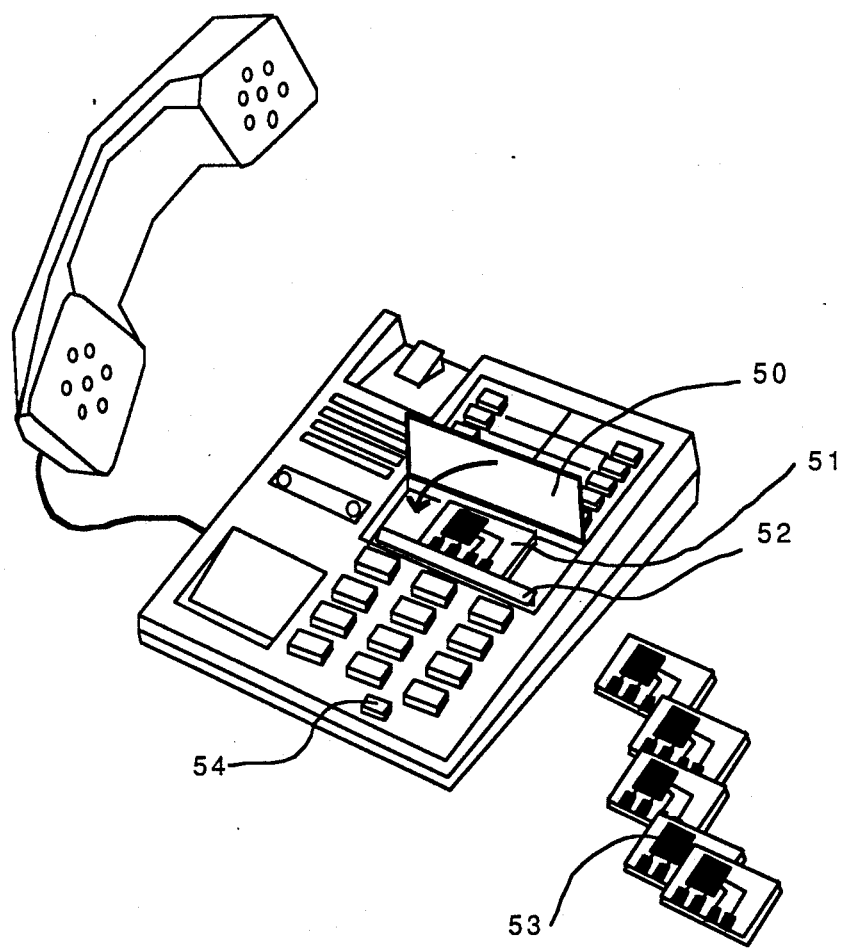
FIG. 5 shows the new Music On Hold Card feature added to the telephone in FIG. 1.

FIG. 5 shows the use of the MOHC-Music On Hold Card 53. An MOHC 51 is plugged into the telephone through a special compartment, which can be opened through a small swing door 50. Each MOHC contains an integrated circuit 53 to store and generate music or songs. When the HOLD button 54 is pressed, the MOHC plugged inside the telephone will start playing music to the party just put on hold. The MOHC inside the telephone is held down by a connector 52, which services as a mechanical clamp as well as an electrical interface between the phone and the MOHC.

What is claimed is:

1. A telephone comprising one, two, or, all of the following:
    a timer circuit to save long distance tolls;
    a panic switch to activate a circuit to automatically call multiple numbers and to broadcast an emergency message;
    a means to allow the phone user to play different music recordings when the phone is on HOLD by plugging in different music generator cards.

2. A telephone as in claim 1 wherein the timer is made of solid state semiconductor components and is an integral part of the telephone.

3. A telephone as in claim 1 wherein the timer keeps a count of the total number of message units or toll units used and shows the amount of time used in the current unit.

4. A telephone as in claim 1 wherein there is a flashing indicator light to warn the user when the current toll unit is ending soon.

5. A telephone as in claim 1 wherein the timer can be set/reset manually by a button on the front panel or electronically by monitoring the telephone line condition.

6. A telephone as in claim 1 wherein there is an external switch connected through a cable to the telephone.

7. A telephone as in claim 6 wherein when the external switch is activated, a special electronic circuit in the said telephone will do the following:
    a. It will automatically call a list of telephone numbers prestored in its semiconductor memory, and;
    b. For each number successfully connected and answered, it will broadcast an emergency message pre-stored in its semiconductor memory, and;
    c. For each number unsuccessfully connected or successfully connected but not answered in a predetermined period, it will skip to the next telephone number on the list in a round robin fashion.

8. A telephone as in claim 1 wherein there is a built in mechanical and electrical interface to accept small plug-in type printed circuit cards. Each of such printed circuit cards contains an integrated circuit to generate music or songs for the party that is put on hold.

9. A telephone as in claim 8 wherein these plug-in type cards are easily interchangeable.

10. A telephone as in claim 1 wherein there is an audio signal from the earpiece of the telephone handset to warn the user when the current toll unit is ending soon.

* * * * *